United States Patent [19]

Watanabe

[11] Patent Number: 4,632,343
[45] Date of Patent: Dec. 30, 1986

[54] FASTENING DEVICE FOR BUNDLING BAND
[75] Inventor: Koji Watanabe, Fujisawa, Japan
[73] Assignee: Nifco Inc., Yokohama, Japan
[21] Appl. No.: 739,591
[22] Filed: May 30, 1985
[30] Foreign Application Priority Data Jun. 5, 1984 [JP] Japan ............................ 59-82494[U]

[51] Int. Cl.$^4$ ............................................. F16L 3/08
[52] U.S. Cl. ................... 248/73; 24/30.5 R; 248/74.3
[58] Field of Search ............ 248/73, 74.3, 74.1, 248/74.4, 60, 62; 24/135 N, 30.5 R, 20 R

[56] References Cited
U.S. PATENT DOCUMENTS

| 538,075 | 4/1895 | Herrberg | 24/135 N |
|---|---|---|---|
| 2,969,216 | 1/1961 | Hallsey | 248/74.3 X |
| 4,347,999 | 9/1982 | Sato et al. | 248/74.1 X |
| 4,439,902 | 4/1984 | Huxtable | 248/74.4 X |

FOREIGN PATENT DOCUMENTS

| 2545447 | 11/1984 | France | 24/30.5 R |
|---|---|---|---|
| 450074 | 4/1968 | Switzerland | 248/62 |
| 817045 | 7/1959 | United Kingdom | 248/74.3 |

Primary Examiner—Ramon S. Britts
Assistant Examiner—David L. Talbott
Attorney, Agent, or Firm—Trexler, Bushnell & Wolters, Ltd.

[57] ABSTRACT

A fastening device for a bundling band comprises a grommet and a punch. The grommet is provided with a tubular insertion part incorporating therein a hollow inner passage for admitting opposite ends of a bundling band, a flange part formed at one end of the insertion part as extended from the outer wall of the insertion part, and a supporting part projected from the outer wall as opposed to the rear side of the flange part. The insertion part is provided on one of the opposite outer wall surfaces thereof with a pin extending outwardly therefrom to a length greater than the distance between the opposite outer wall surfaces and connected at the base portion thereof with the outer wall through a thin-walled peripheral part and on the other opposite outer wall surface thereof with a perforation formed therein in a diameter greater than the diameter of the pin. The punch is provided at the leading end thereof with a projection of a diameter smaller than the diameter of the pin and adapted to drive the pin into the perforation of the grommet.

7 Claims, 6 Drawing Figures

FASTENING DEVICE FOR BUNDLING BAND

BACKGROUND OF THE INVENTION

1. Field of the Invention

This invention relates to a fastening device for a bundling band, which is adapted to allow the bundling band wound around a plurality of pipes laid inside the engine room of an automobile or a plurality of cords laid inside an electric machine to be fastened to a panel forming the engine room or electric machine housing.

2. Description of the Prior Art

Any conventional fastening device of the above description requires great force to keep a plurality of cords fast in a bundled state.

Japanese Utility Model Publication No. SHO 59(1984)-10464, for example, discloses a rigid tubular fastener designed so that a bundling band wrapped around a plurality of cords is fastened by inserting the opposite ends of the bundling band as tacked side by side past the interior of the fastener and crushing the tubular wall of the fastener flat on the tacked ends of the bundling band with a suitable tool such as a punch. This fastener by nature has the disadvantage that the bundling band will slip off the crushed fastener and release the cords when the fastener has not been crushed down enough to bite into the tacked ends of the bundling band.

Japanese Patent Publication No. SHO 54(1979)-36545 discloses a tubular fastener having a pair of perforations formed symmetrically in the wall thereof so that a bundling band wrapped around a plurality of cords can be fastened by inserting the opposite ends of the bundling band as tacked side by side past the interior of the tubular fastener and piercing the tacked ends of the bundling band with a pin inserted through the opposed perforations thereby keeping the bundling band fast with the pin. In this fastener, however, the opposite ends of the pin thrusting out of the tubular wall of the fastener must be deformed as by crushing so that the pin will be prevented from slipping off the perforations. Specifically, the deformation of the opposite ends of the pin must be effected by holding one end of the pin against a punch provided at the leading end thereof with a hemispherical depression and the other end of the pin against a lower jig having a rigid surface and disposed below the perforation through which the aforementioned other end of the pin is thrust out and pressing the punch and the lower jig toward each other to crush the opposite ends of the pin. For this purpose, the punch is required to have a diameter smaller than the diameter of the perforations and the punch, the pin, and the perforations are required to be correctly centered against one another preparatory to the insertion of the pin.

The tool for driving the pin, therefore, is required to operate with high accuracy and the fastener itself is required to function with high accuracy. This published invention fails to teach means for enabling the fastener already holding the tacked ends of the bundling band to be secured on a panel of the housing.

SUMMARY OF THE INVENTION

An object of the present invention is to provide a fastening device capable of safely and easily securing on a panel the tacked opposite ends of a bundling band wound around a plurality of cords.

To accomplish the object described above, the fastening device for a bundling band according to the present invention comprises (i) a grommet provided with a tubular insertion part incorporating therein a hollow inner passage for admitting opposite ends of a bundling band, a flange part formed at one end of the insertion part as extended from the outer wall of the insertion part, and a supporting part projected from the aformentioned outer wall as opposed to the rear side of the aforementioned flange part, the aforementioned insertion part being provided on one of the opposite outer wall surfaces thereof with a pin extending outwardly therefrom to a length greater than the distance between the opposite outer wall surfaces and connected at the base portion thereof with the outer wall through a thin-walled peripheral part and on the other opposite outer wall surface thereof with a perforation formed therein in a diameter greater than the diameter of the aforementioned pin and (ii) a punch provided at the leading end thereof with a projection of a diameter smaller than the diameter of the aforementioned pin and adapted to drive the pin into the perforation of the aforementioned grommet.

The desired fastening, therefore, is attained simply by inserting the opposite ends of the bundling band through the inner passage of the tubular insertion part, holding the insertion part fast in place, and depressing the protruding end of the pin with the leading end of the punch toward the perforation. Consequently, the pin is torn off the insertion part at the thin-walled peripheral part, and the base of the pin is allowed to fall into the inner passage and the leading end of the base to force its way into the bundling band. As a result, the bundling band is confined within the perforation and the protruding end of the pin is expanded by the leading end projection of the punch along the edge of the hole formed by the departure of the pin and consequently deformed so as not to be extracted from the hole. Since the bundling band is immobilized on the interior of the insertion part, the desired fastening of the bundling band is accomplished by simply inserting the grommet through a hole bored in advance in the panel of the housing. The consequence is that the flange part and the engaging part are brought into fast engagement with the edge of the hole and the grommet is secured to the housing.

BRIEF DESCRIPTION OF THE DRAWINGS

The other objects and characteristic features of this invention will become apparent from the further disclosure of the invention to be made hereinbelow with reference to the accompanying drawings.

DESCRIPTION OF PREFERRED EMBODIMENT

Figure 1:
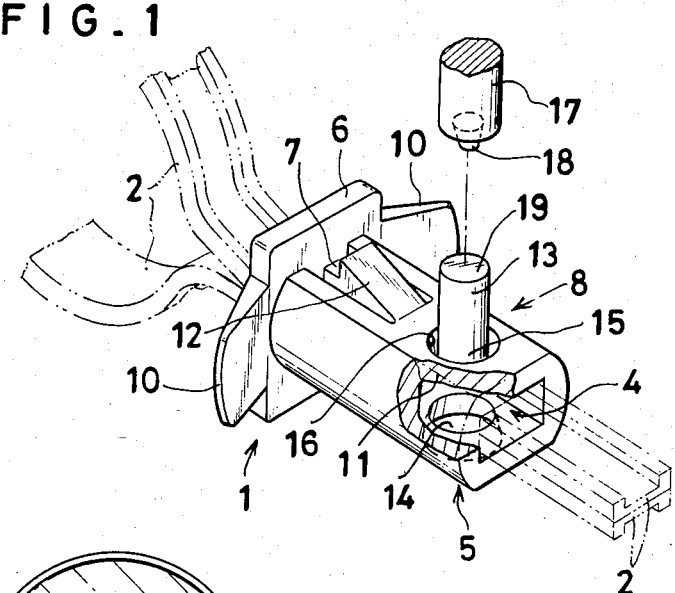
FIG. 1 is a partially cutaway perspective view of a fastening device for a bundling band as one embodiment of this invention.
Figure 5:
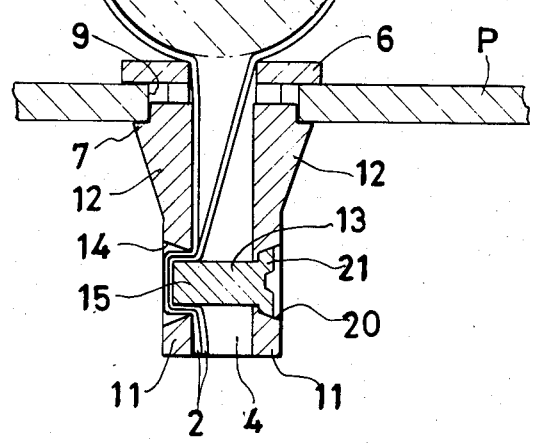
FIG. 5 is a sectioned plan view illustrating the state of cords bundled with the grommet.
Figure 6:
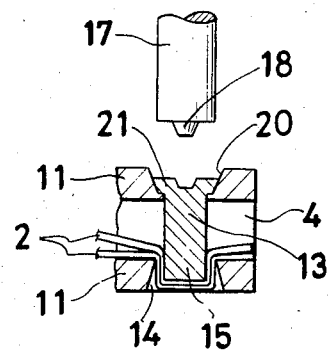
FIG. 6 a cross section illustrating the state of a pin driven into the grommet.
Figure 2:
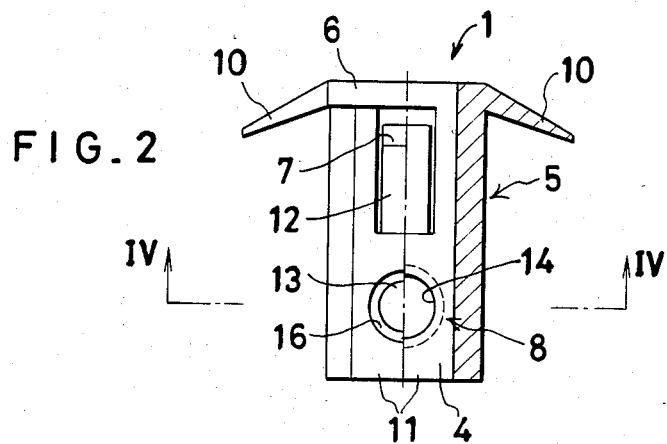
FIG. 2 is a plan view of the grommet in the fastening device of FIG. 1, with one half thereof sectioned to expose the interior thereof to view.
Figure 3:
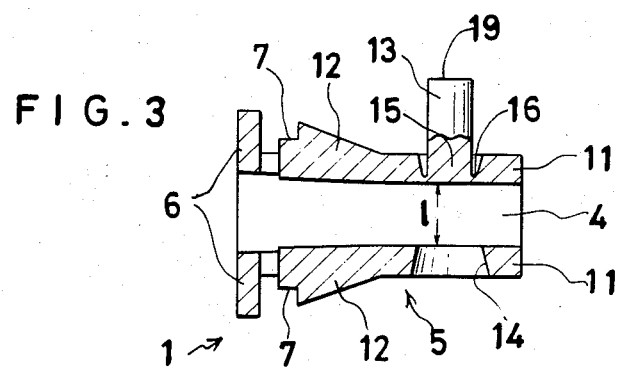
FIG. 3 is a longitudinally sectioned side view of the grommet of FIG. 2.
Figure 4:
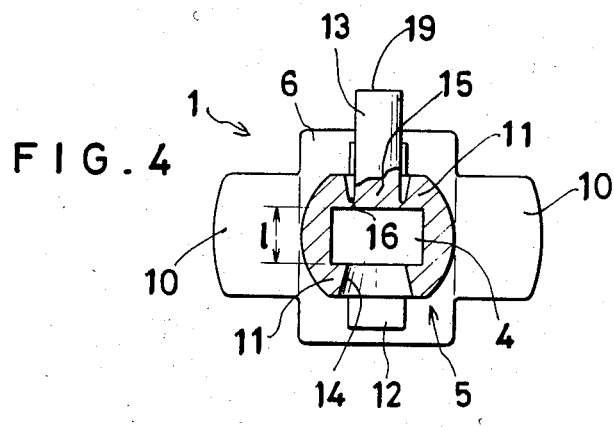
FIG. 4 is a cross section taken through FIG. 2 along the Line IV—IV.

The fastening device for a bundling band according to the present invention will be described below with reference to the preferred embodiment illustrated in the accompanying drawings. In the drawings, 1 denotes a grommet formed of plastic, 2 a bundling band for binding a bundle 3 consisting of a plurality of pipes or cords, and P a panel such as of an engine room or an electric machine and serving to hold the grommet 1.

The grommet 1 has its main element an insertion part 5 of the shape of an angular tube incorporating therein a hollow inner passage 4 for permitting insertion therethrough of tacked opposite ends of the bundling band 2.

The insertion part 5 is provided at the leading end thereof with a flange part 6 expanded outwardly from the outer wall at the edge of the insertion part 5 and an engaging part 7 projected from the outer wall of the insertion part 5 as opposed to the rear side of the flange part 6. It is also provided at the rear end thereof with confining means 8 for the bundling band 2. The grommet 1 is inserted, as from the insertion part 5 thereof, into a square hole formed in the panel P in conformity with the outer shape of the insertion part 5 and fastened to the panel P by virtue of the flange part 6 and the engaging part 7.

From the opposite edges of the aforementioned flange part 6, blade parts 10, 10 extend laterally in the opposite directions. The blade parts 10 are adapted to collide with one side of the panel P and cooperate with the engaging part 7 so as to nip the panel P resiliently therebetween. The engaging part 7 is provided with two tongue pieces 12, 12 raised inside areas defined by edges of U-shaped notches cut in the opposite outer walls 11, 11 of the insertion part 5. These tongue pieces 12, 12 have their outer faces raised each in the shape of two sides of a triangle so that these tongue pieces and the rear side of the flange part 6 will cooperate with each other to nip the panel P fast therebetween.

The aforementioned confining means 8 comprises a pin 13 standing on one of the outer walls 11 to extend outwardly therefrom by a length greater than the distance l between the opposite outer walls 11, 11 and a perforation 14 formed in the other outer wall 11 and adapted to permit insertion of the pin 13. The base end portion 15 of the pin 13 is connected with the outer wall 11 through a thin-walled peripheral part 16 so that the pin 13 will be readily torn off at the base end portion 15 under external pressure. The perforation 14 has a diameter larger than the diameter of the pin 13 and the edge of this perforation is gradually diverged downwardly. By the use of a punch 17, the aforementioned pin 13 is driven into the insertion part 5. The aforementioned punch 17 is provided at the leading end thereof with a projection 18 so shaped that the diameter thereof, which is smaller at the leading end thereof than the diameter of the pin 13, is gradually increased from the leading end to the base end thereof.

The bundling band 2 is a strip made of plastic. For use in the present embodiment, it has the opposite lateral edges increased in thickness so as to prevent the band from being elongated in the longitudinal direction. The central part of this band has a small enough thickness to be readily deformed by the pin 13.

In accordance with the embodiment constructed as described above, the bundle 3 of a plurality of cords is fastened as bound fast together to the panel P by means of the grommet 1 as follows. The bundling band 2 is wound around the bundle 3 in the form of a loop. The opposite ends of the bundling band 2 are inserted side by side through the inner passage 4 of the insertion part 5. They are fully drawn to tighten the bundle 3 inside the loop of the bundling band 2. Then, with the bundle 3 held in the tightened state and the periphery of the insertion part 5 held fast in place, the punch 17 is lowered until the projection 18 at the leading end thereof collides with the protruded end 19 of the pin 13. Next, the punch 17 is made to apply force to the pin 13 in the axial direction thereof. Owing to this force, the base end portion 15 of the pin 13 is torn from the outer wall 11 at the thin-walled peripheral part 16 and is caused consequently driven into the inner passage 4 of the insertion part 5. The base end portion 15 of the pin 13 bites into the ends of the bundling band 2 and causes the superposed ends of the bundling band 2 to be driven into the perforation 14 as deformed in the pattern of a pan. Consequently, the bundling band 2 is confined within the perforation. At the peripheral part 16, a hole 20 is formed by the departure of the base end portion 15 of the pin 13. This hole 20 admits the protruded head portion 19 of the pin 13. Since the leading end portion of the punch 17 penetrates axially into the protruded end portion 19 of the pin 13, although only slightly, the periphery of the protruded end portion 19 is deformed as expanded along the edge of the hole 20, with the result that the expanded portion 21 will come into tight contact with the edge of the hole. Owing to the deformation of the protruded end portion 19, the pin 13 is immobilized in the axial direction. Since the edge of the perforation 14 is converged upwardly, the confinement of the bundling band 2 is enhanced.

As described above, the bundling band 2 has the opposite ends thereof immobilized inseparably within the inner passage 4 of the insertion part 5 by means of the pin 13, with the bundle 3 bound fast inside the loop thereof.

The grommet 1 which has now firmly held the bundle 3 is next required to be forced into the hole 9 in the panel P in a state aligned correctly with the hole 9. As the insertion part 5 of the grommet 1 is inserted into the hole 9 in the panel P, the engaging part 7 rides over the edge of the hole 9 in the panel and slips through the hole 9 with the tongue pieces 12, 12 resiliently bent inwardly. As the engaging part 7 slides past the hole 9, the tongue pieces 12 spring back and cooperate with the rear side of the flange part 12 to nip the panel P therebetween.

In the present embodiment, the outer wall of the insertion part 5 is made thicker at one end than at the other so that the width of the inner passage 4 is greater on the inlet side than on the outlet side. Therefore, the bundling band 2 can be inserted readily through the inlet side. Also, the distance between the opposite outer walls 11, 11 is short and, as a result, the length of the pin and the driving stroke of the pin 13 can be shortened proportionately.

The present embodiment has been depicted as using just one grommet 1. Since a plurality of grommets can be manufactured in a single molding, as many grommets as desired may be laterally connected through the blade pieces 10. The series of grommets so formed may be contained in the magazine of a tool designed for repeated use of such grommets.

The punch 17 may be driven manually or by the use of a hydraulic piston. .

In accordance with the present invention constructed as described above, the pin can be immobilized simply by driving the pin in one direction with the punch having a projecting tip. This invention is not required to deform both the opposite ends of a pin or to use a lower jig for the purpose of taking firm hold of the pin on the side opposite from the punch. Thus, the driving of the pin is accomplished with great ease.

Since the punch is provided with a projecting tip, the hole formed by the departure of the base end portion of the pin is not required to be given a diameter equalling the diameter of the punch. Only the base end portion of the pin is required to be attached via a thin-walled portion so as to be readily torn under external pressure. Thus, the parts of the grommet can be designed with low precision.

What is claimed is:

1. A fastening device for a bundling band, comprising (i) a grommet provided with a tubular insertion part incorporating therein a hollow inner passage for admitting opposite ends of a bundling band, a flange part formed at one end of said insertion part as extended from the outer wall of said insertion part, and a supporting part projected from said outer wall as opposed to the rear side of said flange part, said insertion part being provided on one of the opposite outer wall surfaces thereof with a pin extending transversely outwardly therefrom to a length greater than the distance between said opposite outer wall surface and connected at the base portion thereof with the outer wall through a thin-walled peripheral part and on the other opposite outer wall surface thereof with a perforation formed therein in a diameter greater than the diameter of said pin and (ii) a punch provided at the leading end thereof with a projection of a diameter smaller than the diameter of said pin and adapted to drive the pin into the perforation of said grommet and adapted to enlarge the end of the pin struck by said punch.

2. A fastening device as set forth in claim 1 wherein said hollow inner passage has a transverse dimension substantially greater than twice the thickness of said band.

3. A one-piece fastening device for a bundling band comprising a grommet having a tubular insertion shank having an extending end and an opposite end and having an axial passage for receiving the opposite ends of a bundling band in substantially side-by-side contacting relation, transverse flange means adjacent said opposite end adapted to engage a panel with said shank extending through an aperture in said panel, resilient retaining means on said shank spaced axially from said transverse flange means and adapted to pass resiliently through an aperture in a panel and to retain said shank in said panel opposite to said flange means, said tubular shank having a pair of aligned transverse apertures adjacent said entering end, each opening outwardly of said shank and inwardly to said axial passage, and a transverse external exposed pin extending outwardly of said shank in alignment with said apertures and joined to said shank adjacent one of said apertures by a thin readily fractioned section of material whereby said pin is adapted to be driven into both of said apertures and to trap the opposite ends of a bundling band in one of said apertures about the end of said pin.

4. A fastening device as set forth in claim 3 wherein said shank has a pair of opposite parallel chordal flats along its length for non-rotatable mounting of said fasteners, and wherein said apertures are in said chordal flats and said pins extends perpendicurlarly from one chordal flat.

5. A fastening device as set forth in claim 3 wherein each of said apertures is of minimum diameter adjacent said axial passage and tapers outwardly to the outer surface of said shank.

6. A fastening device as set forth in claim 3 in combination with a bundling band with the ends of said band extending through said axial passage in side-by-side substantially contacting relation and past said apertures.

7. The combination as set forth in claim 6 wherein said band has a predetermined thickness, and wherein said axial passage has a transverse dimension substantially greater than twice said predetermined thickness.

* * * * *